United States Patent [19]

Wünsch et al.

[11] Patent Number: 5,763,551

[45] Date of Patent: Jun. 9, 1998

[54] PROCESS FOR PREPARING FILTERABLE POLYSTYRENE DISPERSION

[75] Inventors: Josef Wünsch, Schifferstadt; Lembit Tuttelberg, Mannheim; Fritz Heinrich, Ludwigshafen; Siegbert Brand, Speyer, all of Germany

[73] Assignee: BASF Aktiengesellschaft, Ludwigshafen, Germany

[21] Appl. No.: 894,750

[22] PCT Filed: Feb. 29, 1996

[86] PCT No.: PCT/EP96/00827

§ 371 Date: Aug. 26, 1997

§ 102(e) Date: Aug. 26, 1997

[87] PCT Pub. No.: WO96/27623

PCT Pub. Date: Sep. 12, 1996

[30] Foreign Application Priority Data

Mar. 6, 1995 [DE] Germany ............ 195 07 777.6

[51] Int. Cl.$^6$ ............ C08F 2/14; C08F 112/08
[52] U.S. Cl. ............ 526/201; 526/173; 526/346; 526/909
[58] Field of Search ............ 526/201, 346, 526/909, 173

[56] References Cited

U.S. PATENT DOCUMENTS

| 3,259,595 | 7/1966 | Wright. | |
|---|---|---|---|
| 3,645,959 | 2/1972 | Pilato et al.. | |
| 3,770,712 | 11/1973 | Schwab | 526/201 |
| 4,029,869 | 6/1977 | Ingram et al.. | |
| 4,247,434 | 1/1981 | Vanderhoff et al.. | |
| 4,871,814 | 10/1989 | Gunesin et al.. | |
| 4,942,209 | 7/1990 | Gunesin. | |
| 5,395,902 | 3/1995 | Hall | 526/201 |

FOREIGN PATENT DOCUMENTS

| 1532199 | 11/1978 | United Kingdom | 526/201 |
|---|---|---|---|

*Primary Examiner*—Fred Teskin
*Attorney, Agent, or Firm*—Keil & Weinkauf

[57] ABSTRACT

Particulate, filterable polystyrene formulations are obtained by anionic polymerization of styrene in nonaqueous dispersion if the polymerization is carried out in an aliphatic hydrocarbon as the dispersing medium and with a styrene/diene/styrene three-block copolymer, for example based on polybutadiene or polyisoprene, as the dispersant.

9 Claims, No Drawings

PROCESS FOR PREPARING FILTERABLE POLYSTYRENE DISPERSION

Styrene polymers are used in particular for consumer products. They can be used alone or in the form of polymer blends with other thermoplastic polymers for the production of materials having many advantageous properties. Polystyrene is chemically inert to a large number of chemical compounds and has excellent proccessability. In general, the physical properties and the external form of styrene polymers depend on the method of their preparation.

The present invention relates to a process for the preparation of particulate polystyrene (for example in the form of a latex or powder) by anionic polymerization of styrene which is dispersed in a hydrocarbon nonsolvent, a special styrene/butadiene block copolymer being used as the dispersant.

There is considerable interest in particulate polymers. In some cases, attempts are made to obtain polymers having a particularly narrow molecular weight distribution and a particle size of more than 200 μm. As described in U.S. Pat. No. 4,247,434, polymer microparticles in latex form are used in many applications, for example as a reference standard for the calibration of various instruments in medical research. Polystyrene in particle form is once again of particular interest here.

U.S. Pat. No. 3,645,959 describes the preparation of high molecular weight vinyl polymers, for example polystyrene, in nonaqueous dispersion. Up to one percent of a diolefin, for example norbornadiene, is added as a dispersant for this purpose.

U.S. Pat. No. 3,259,595 describes a polystyrene preparation starting from a suspension polymerization, which polystyrene preparation can be processed to a polymer film having an approximately cellular structure.

U.S. Pat. No. 4,029,869 describes a method for the preparation of polystyrene by free radical suspension polymerization (initiated by peroxide). Very broad molecular weight distributions are obtained.

The anionic emulsion polymerization permits the preparation of polstyrene dispersions having a narrow molecular weight distribution. This method is described, for example, in European Patent 290,195 and U.S. Pat. Nos. 4,942,209 and 4,871,814; styrene/diene two-block copolymers are used as dispersants.

Polystyrene particles which were prepared by means of anionic emulsion polymerization with the aid of such a two-block copolymer had a particle size of less than 15 μm and proved to be non-filterable since such particles are not retained even by very fine filter cloths and blocked the finest filters used by way of experiment. Where it was possible to obtain such fine polystyrene particles from the dispersion on the pilot scale, the powders obtained could be very readily swirled up, so that production on the industrial scale would have given rise to the danger of dust explosions.

We have found that, in the anionic emulsion polymerization of styrene, polystyrene particles which have a diameter of more than 100 μm, preferably from 200 to 1000 μm, and which have proven capable of being filtered are formed as a result of the use of a styrene/butadiene/styrene (three-)block polymer as the dispersant. Such polystyrene dispersions avoid the danger of a dust explosion since the filter cake obtained can, if necessary, be processed directly to give an extrudate.

The present invention relates directly to a process for the preparation of polystyrene by anionic polymerization of styrene in nonaqueous dispersion, which is carried out in an aliphatic hydrocarbon as the dispersing medium and with a styrene/diene/styrene three-block copolymer as the dispersant.

The styrene/diene/styrene three-block copolymer to be used according to the invention is used, for example, in an amount of from 0.1 to 10% by weight, based on styrene, and the diene block may be hydrogenated or unhydrogenated. Suitable copolymers are commercially available and can be used directly for carrying out the invention.

Instead of copolymers having polybutadiene blocks, it is also possible to use those which contain polymerized polyisoprene, and these in turn may be hydrogenated or unhydrogenated.

The dispersing medium used is, for example, an alkane of 4 to 8 carbon atoms, preferably a butane, pentane or hexane, or a hydrocarbon mixture of, for example, 4 to 8 carbon atoms.

The polymerization temperature is in general from 50° to 100° C. and the dispersion used contains, for example, from 20 to 60% of styrene.

The amount of initiator is chosen in a known manner so that the polystyrene to be prepared has a molecular weight of from 5000 to 10,000,000 g/mol; the method is therefore not restricted with regard to the obtainable molecular weights. It is found that the polystyrene obtained generally has a molecular nonuniformity (distribution width of the molecular weight) $M_w/M_n$ of less than 2.

In the novel process, it is possible to obtain filterable polystyrene dispersions by an anionic method. While the process known to date, in which styrene/butadiene two-block polymers are used as dispersants, gives only particles which have a size of less than 5 μm and block screens or filter materials, the invention gives substantially larger particles which furthermore have a desirably narrow molecular weight distribution ($M_w/M_n$ preferably less than 2). The novel dispersions can readily be converted by filtration into corresponding concentrates (latices), and, at higher concentration and if the preparation of, for example, extrudates is desired, corresponding filter cakes, which can also be dried; after the dispersing medium has been separated off, there is no longer any danger of a dust explosion.

The polymerization can be carried out, for example, as follows:

A styrene/butadiene/styrene (three-)block polymer which has a styrene block, an unhydrogenated or a hydrogenated butadiene middle block and another styrene block is dissolved in styrene to give an about 0.5–20% strength by weight solution, based on styrene. A commercial block polymer having a suitable structure, for example one of the brands available under the trade name Kraton® G (Shell Chemie), may be used. This solution is mixed with, for example, pentane and heated to, for example, 30° C. All impurities are pretitrated with a dilute solution of a conventional initiator (eg. sec-butyllithium) until a permanent yellow color is obtained. The calculated amount of initiator is then added and the mixture is heated to an internal temperature of from 65° to 70° C. The polymerization is allowed to go to completion (about 1 hour) and is stopped with methanol.

The dispersion can be freed from the dispersing medium by filtration, and the particles obtained can be dried under reduced pressure.

Regarding the other details of the anionic emulsion polymerization method, reference may be made to the abovementioned publications in this area.

The novel products can be mixed with polymers as described in Kunststoff Kompendium by Franck and Biederbick, Vogel-Verlag, 1990. The novel products are preferably mixed with styrene polymers and styrene copolymers. Examples of these are S/B copolymers and styrene/butadiene block copolymers (two-, three-or four-block copolymers or multiblock copolymers), it also being possible for the diene component to be hydrogenated. Instead of butadiene, it is also possible to use isoprene or another 1,3-diene. In the styrene homopolymers, general purpose polystyrene is preferred. Surprisingly, an improvement in the mechanical properties is found in the case of blends with a general purpose polystyrene and the novel products. The novel high molecular weight polystyrene is readily compatible with the general purpose polymers and, for example, improves the yield stress, the modulus of elasticity and the toughness.

The blends are prepared in solution or mechanically (for example by means of an extruder).

COMPARATIVE EXPERIMENT

A mixture of 50% by weight of polystyrene 165 H from BASF AG and 50% by weight of polystyrene 486 M was dissolved in toluene and precipitated with methanol and dried at 110° C. Thereafter, test specimens were injection molded at a melt temperature of 220° C. and the mechanical profile of the blend was tested. The tensile test according to ISO 527 gave the following values: tensile modulus of elasticity: 2346 MPa; tensile strength: 32 MPa; nominal elongation at break: 30.9%; Charpy impact strength according to ISO 179/1Eu 157.4.

EXAMPLE 2

A mixture of 40% by weight of polystyrene 165 H from BASF AG and 50% by weight of polystyrene 486 M and 10% by weight of the novel polystyrene having a molecular weight $M_w$ of 1,000,000 g/mol (D=1.1) was dissolved in toluene and precipitated with methanol and dried at 110° C. Thereafter, test specimens were injection molded at a melt temperature of 220° C. and the mechanical profile of the blend was tested. The tensile test according to ISO 527 gave the following values: tensile modulus of elasticity: 2841 MPa; tensile strength: 47 MPa; nominal elongation at break: 38.2%; Charpy impact strength according to ISO 179/1Eu 204.0.

EXAMPLE 3

4.55 g of an S-B-S copolymer commercially available under the name Kraton® G 1652 from Shell Chemicals were dissolved in 182 g of styrene under nitrogen and the solution was stirred into 330 g of n-hexane. All impurities were pretitrated with sec-butyllithium, and the polymerization was initiated at 26° C. by adding 0.73 mmol of sec-butyllithium. The temperature was regulated to 63° C. and the mixture was left at this temperature for 90 minutes. To stop the reaction, an excess (10 ml) of isopropanol was added. The dispersion obtained was filtered by means of a glass filter D4 (pore size 10–16 μm, manufacturer Schott, Mainz) and was dried in a drying oven at 65° C. under reduced pressure for 12 hours. The conversion was more than 99%. A sample was suspended in immersion oil and was examined between two cover plates in transmitted light under the microscope (Zeiss Axiophot); the particles had a size from about 350 to 700 μm. $M_w$, determined by gel permeation chromatography, was 250,000 g/mol and $M_w/M_n$ was 1.19.

COMPARATIVE EXPERIMENT 4.55 g of an S-B two-block copolymer commercially available under the name Nippon® NS 312S from Nippon Zeon were dissolved in 182 g of styrene under nitrogen and the solution was stirred into 330 g of n-hexane. After pretitration of the impurities with se,c-butyllithium, the polymerization was initiated at 26° C. by adding 1.82 mmol of sec-butyllithium and a further procedure was carried out as above. The dispersion proved to be nonfilterable; it was allowed to settle out and was decanted, and the residue was dried in a drying oven at 65° C. under reduced pressure for 12 hours. The conversion was more than 99%; the particle size was about 6 μm. $M_w$ was 140,000 g/mol and $M_w/M$ was 1.16.

We claim:

1. A process for the preparation of polystyrene by anionic polymerization of styrene in nonaqueous dispersion, wherein the polymerization is carried out in an aliphatic hydrocarbon as the dispersing medium and with a styrene/diene/styrene three-block copolymer as the dispersant.

2. A process as claimed in claim 1, wherein the styrene/diene/styrene three-block copolymer is used in an amount of from 0.1 to 10% by weight, based on styrene.

3. A process as claimed in claim 1, wherein the block copolymer contains polymerized polybutadiene or polyisoprene and the diene polymer is hydrogenated or unhydrogenated.

4. A process as claimed in claim 1, wherein the dispersing medium used is an alkane of 4 to 8 carbon atoms.

5. A process as claimed in claim 4, wherein a butane, pentane or hexane or a mixture of alkanes of 4 to 8 carbon atoms is used.

6. A process as claimed in claim 1, wherein the polymerization temperature is from 50° to 100° C.

7. A process as claimed in claim 1, wherein a dispersion which contains from 20 to 60% by weight of styrene is used.

8. A process as claimed in claim 1, wherein the amount of initiator used corresponds to a molecular weight of from 5000 to 10,000,000 g/mol for the polystyrene to be prepared.

9. A process as claimed in claim 1, wherein the procedure is chosen so that the polystyrene obtained has a molecular nonuniformity (distribution width of the molecular weight) $M_w/M_n$ of less than 2.

* * * * *